May 3, 1966  W. C. BORTZFIELD ET AL  3,248,961
BELT SHIFTER FOR MULTIPLE SPEED DRIVE
Filed Jan. 3, 1964  2 Sheets-Sheet 1
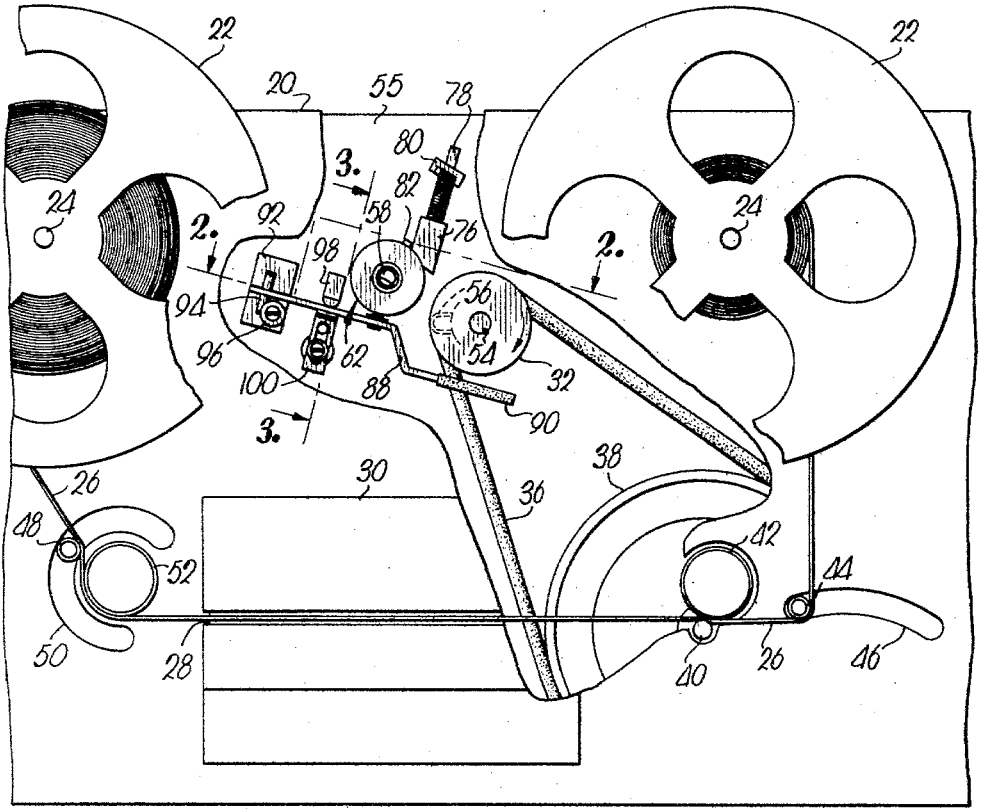
Fig.1.
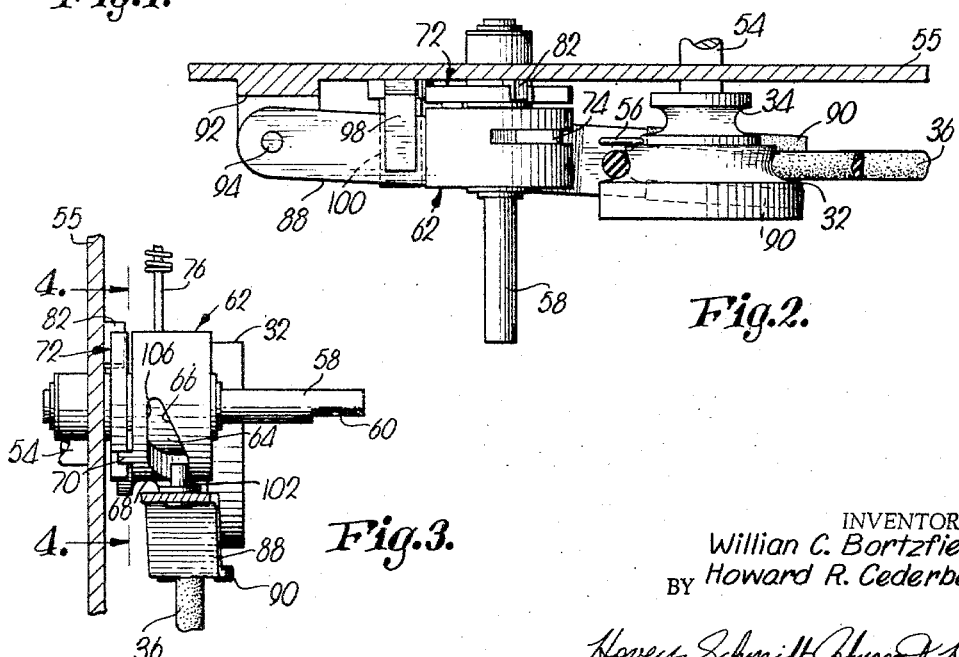
Fig.2.
Fig.3.
INVENTORS.
William C. Bortzfield
BY Howard R. Cederberg
Hovey, Schmidt, Johnson & Hovey.
ATTORNEYS.

May 3, 1966 W. C. BORTZFIELD ETAL 3,248,961
BELT SHIFTER FOR MULTIPLE SPEED DRIVE
Filed Jan. 3, 1964 2 Sheets-Sheet 2
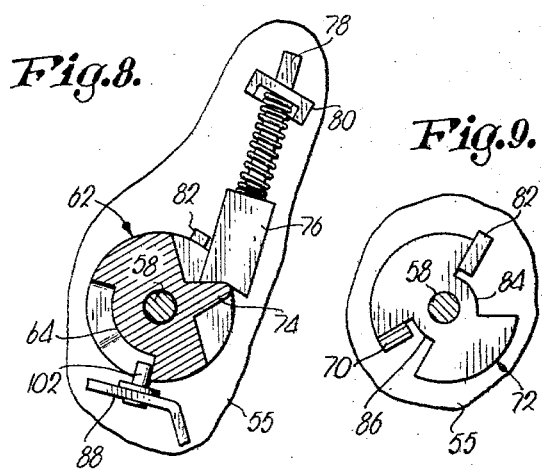
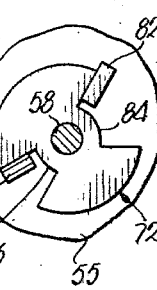
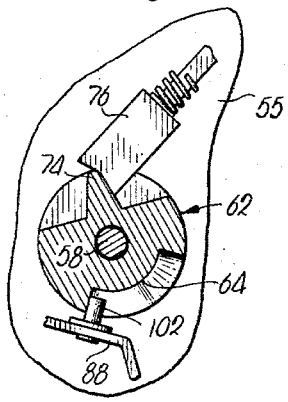
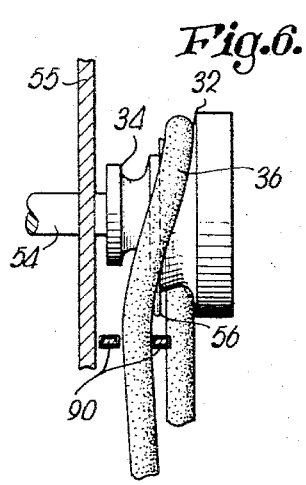
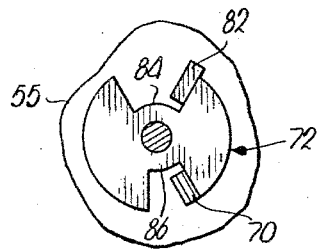
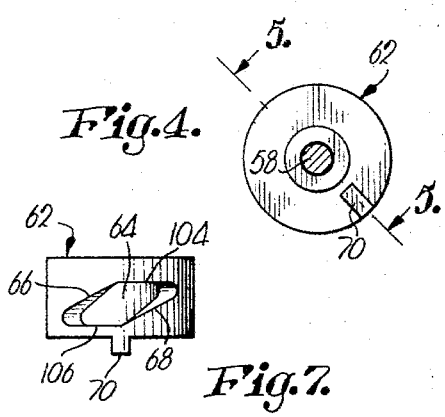
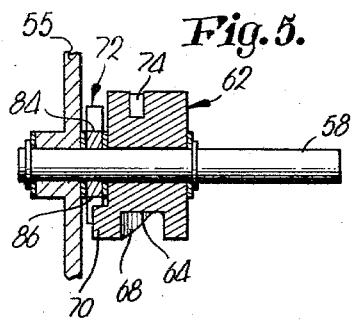
INVENTORS.
William C. Bortzfield
Howard R. Cederberg
BY
ATTORNEYS.

United States Patent Office 3,248,961
Patented May 3, 1966

3,248,961
BELT SHIFTER FOR MULTIPLE SPEED DRIVE
William C. Bortzfield and Howard R. Cederberg, both of Tulsa, Okla., assignors to Midwestern Instruments, Inc., Tulsa, Okla., a corporation of Delaware
Filed Jan. 3, 1964, Ser. No. 335,504
10 Claims. (Cl. 74—242.3)

This invention relates to apparatus for shifting the belt of a multiple speed belt and pulley drive and, more specifically, to such apparatus for use with the belt and pulley drive of a tape transport or tape recorder.

Various means are presently employed to obtain multiple tape speeds in tape transport drive apparatus. Manifestly, one way of achieving multiple speeds is to employ a multiple speed drive motor coupled with the drive pulley or other drive mechanism. However, such motors are considerably more expensive than single-speed motors and thus present an obvious cost disadvantage.

An alternative and satisfactory arrangement for most applications is to employ the less expensive, single-speed motor in conjunction with a multiple speed belt and pulley drive assembly. This scheme, however, requires the use of some means to shift the belt on the pulleys when it is desired to change speeds. For efficient and positive operation such speed changing must be achieved rapidly from the front panel or tape deck of the recorder.

It is, therefore, the primary object of this invention to provide improved belt-shifting apparatus for multiple speed belt and pulley drives that will shift the belt rapidly and positively with a minimum of operator effort and inconvenience.

Another important object of this invention is to provide a belt shifter as aforesaid that effects the shifting movement of the belt through the use of relatively simple and inexpensive means which is manually triggered but which does ont rely upon manual force to achieve the shifting function.

It is still another object of this invention to provide a belt-shifting device for use in conjunction with a pair of juxtaposed pulleys, the device including shiftable cam structure which is actuated in response to operation of the device to, in turn, effect shifting of a member in engagement with the belt.

Yet another object of this invention is to provide a belt-shifting device as set forth in the last-mentioned object which utilizes spring-driven means for effecting rapid and positive shifting of the cam structure to actuate the belt-shifting member.

Other objects will become apparent as the detailed description proceeds.

In the drawings:

FIGURE 1 is a fragmentary, elevational view of the panel or deck of a tape recorder, a portion of the panel being broken away to reveal the instant invention and associated structure;

FIG. 2 is a sectional view taken along line 2—2 of FIG. 1, the spring-loaded plunger being removed and the belt being partially broken away for clarity;

FIG. 3 is a sectional view taken along line 3—3 of FIG. 1;

FIG. 4 is a fragmentary, sectional view taken along line 4—4 of FIG. 3;

FIG. 5 is a sectional view taken along line 5—5 of FIG. 4, the shaft being shown in elevation for clarity;

FIG. 6 is a fragmentary, sectional view through the chassis of the recorder revealing the drive pulleys and the shiftable yoke during the belt-shifting operation;

FIG. 7 is an elevational, detailed view showing the cam structure of the instant invention;

FIG. 8 is a fragmentary, cross-sectional view showing the spring-loaded plunger, the rotatable cam device, and the cam follower on the belt-shifting member in one operative position;

FIG. 9 is a fragmentary, cross-sectional view showing the disposition of the actuator element of the instant invention when the components revealed in FIG. 8 are in the positions shown;

FIG. 10 is a view similar to FIG. 8 showing the components shifted to their other operative positions; and FIG. 11 is a view similar to FIG. 9 showing the corresponding position of the actuator element when the components revealed in FIG. 10 are in the positions shown.

Referring particularly to FIG. 1 at the outset, the numeral 20 denotes the panel or deck of a tape recorder. A pair of tape spools or reels 22 are shown mounted on corresponding spindles 24 extending through panel 20. Magnetic tape 26 interconnects the two spools in the conventional manner, tape 26 being received by a slot 28 in hood 30. It should be understood that hood 30 is employed as a housing for the various recording and transcribing heads as well as the controls of the recorder.

Power for driving the tape is furnished by a prime mover (not shown) coupled with a pair of drive pulleys 32 and 34. A belt 36 is shown interconnecting pulley 32 with a flywheel or driven pulley 38. A tape capstan 40 extends axially from the hub of flywheel 38 through an opening in panel 20. Tape 26 is trained over capstan 40 and held in engagement therewith by a pressure roller 42. A tape guide 44 extending through an arcuate slot 46 in panel 20, a tape guide 48 extending through an arcuate slot 50 in panel 20, and a roller 52 associated with guide 48 serve to align the tape with slot 28 and capstan 40 and maintain proper tension thereon.

It will be appreciated that the foregoing has set forth a tape recorder or transport of essentially conventional construction wherein the tape 26 is driven by the frictional engagement therewith of the rotating capstan 40 and the pressure roller 42. Roller 42 holds the tape in engagement with the capstan and, in most units, roller 42 is movable toward and away from the capstan to alternately engage and disengage the tape and capstan as required. The remainder of this specification will be directed to the means as set forth by the instant invention for shifting belt 36 from pulley 32 to pulley 34 (or vice versa) to change the speed of the capstan to, in turn, alter the tape speed.

Belt 36 is preferably constructed of a resilient material to facilitate the belt-shifting operation and assure that the belt will remain tightly engaged on the smaller pulley 34 as well as the larger pulley 32. For these reasons, a rubber O-ring belt is preferred for use with the instant invention although, manifestly, other types of belts may be employed.

Referring now to the figures in their entirety, it may be seen that pulleys 32 and 34 are mounted on a drive shaft 54 extending through the chassis 55 of the recorder. As mentioned above, pulley 34 is of lesser diameter than pulley 32 so as to provide the dual tape speeds desired. It may be noted that the contours of the pulleys are such as to readily accommodate the O-ring belt 36. A finger 56 in the form of a U-shaped rod is disposed between pulleys 32 and 34 and extends radially outwardly therefrom. The purpose and function of finger 56 will become apparent when the operation of the apparatus is discussed.

Adjacent the drive pulleys an actuator shaft 58 is journaled on chassis 55. Shaft 58 is keyed at 60 to receive a knob (not shown) which is disposed for manual operation by the operator of the recorder. For this purpose, it is evident that shaft 58 will extend through panel 20, and the knob and the face of the panel may be marked with suitable indicia to indicate the particular speed selected.

A generally disc-shaped device 62 is rotatably mounted on shaft 58, device 62 having a guide slot 64 therein defining a pair of cam surfaces 66 and 68. A protuberance 70 on device 62 couples the same with an actuator element 72 rigid with shaft 58. Device 62 is also provided with an internal web 74 (best revealed in FIGS. 8 and 10) which is engaged by a spring-loaded plunger 76. The normally upper end 78 of the plunger is received by a slot (not shown) in a bracket 80 rigid with chassis 55. The slot in the bracket permits swinging movement of the plunger during operation of the apparatus.

Element 72 is normally in engagement with a stop 82 on chassis 55. Stop 82 engages one of the edges of a cutout 84 in element 72, the rotation of the element represented by a comparison of FIGS. 9 and 11 being approximately 60°. In other words, element 72 rotates approximately 60° as one edge of cutout 84 is disengaged from stop 82 and the other edge thereof is placed in engagement with the stop.

Element 72 is also provided with a notch 86, the opposed sides of the notch being subject to engagement by the protuberance 70 extending from device 62. FIGURES 9 and 11 clearly reveal that protuberance 70 may be in engagement with either side of notch 86, depending on the angular position of element 72. Thus, upon rotation of element 72 through an angle of approximately 60°, it may be seen that protuberance 70 shifts from one side of notch 86 to the other. The significance of this arrangement will become clear hereinafter.

A member or arm 88 is pivotally attached to chassis 55 at one end thereof, the free end of the arm being provided with a yoke 90 receiving belt 36. A mounting block 92 on chassis 55 is slotted to receive a pivot pin 94 and the corresponding end of arm 88, the pin extending through the end of the arm and being held in the block by a bolt and washer assembly 96. The normally upper side of arm 88 bears against a post 98 on chassis 55. An adjustable, inverted L-shaped leaf spring 100 bears against the lower side of the arm and opposes post 98 to maintain the arm in engagement with the post but permits swinging of the arm about pin 94 against the friction of the post and the spring. In this manner, excess play in the arm is eliminated.

Arm 88 is provided with a pin or follower 102 which is received by guide slot 64 in device 62. During rotation of the device, follower 102 is engaged by cams 66 and 68 to thereby force the arm to swing about pin 94. It will become evident when the operation of the apparatus is discussed hereinafter that such swinging of the arm causes belt 36 to move from one of the pulleys 32 or 34 to the other thereof.

The operation of the belt shifter will now be discussed. FIGURES 1–5, 8, and 9 illustrate the positions of the various components of the apparatus when belt 36 is being maintained in engagement with pulley 32. At this time the spring-loaded plunger 76 is biasing device 62 in a clockwise direction as viewed in FIGS. 1 and 8. It should be remembered that device 62 is free to rotate about shaft 58 while element 72 is rigid with the shaft. Thus, the only interconnection between device 62 and element 72 is by way of protuberance 70 extending from device 62 and into engagement with a side of notch 86. Therefore, the force of plunger 76 is communicated to element 72 by way of protuberance 70, as shown in FIG. 9, to bias element 72 in a clockwise direction as viewed in FIGS. 1 and 9. It is evident that the mechanism will be static at this point since stop 82 in engagement with an edge of cutout 84 prevents clockwise motion of either element 72 or device 62.

When it is desired to transfer belt 36 from pulley 32, shaft 58 is rotated in a counterclockwise direction approximately 45°. As mentioned heretofore, rotation of shaft 58 may be effected manually by means of a knob (not shown) attached to the keyed portion 60 of shaft 58. It will be seen in the paragraphs to follow that this initial 45° counterclockwise rotation does not actually shift member 88, the actual movement of the member being effected by the action of the mechanism wholly dependent from the manual turning of the shaft.

A comparison of FIGS. 8 and 9 with corresponding FIGS. 10 and 11 illustrates what occurs when shaft 58 is rotated in a counterclockwise direction as aforesaid. It should first be noted in FIGS. 8 and 10 that device 62 has undergone a counterclockwise rotation of approximately 90°. This has moved follower 102 from the right-hand end of guide slot 64 to the left hand end thereof. It is evident that after approximately 45° of rotation the line of action of plunger 76 shifts to now bias device 62 in the counterclockwise direction. In other words, plunger 76 moves "over center" with respect to web 74 and device 62 approximately midway during the rotation of the device.

FIGURE 7 reveals that no pressure is brought to bear against follower 102 during the initial, manually controlled 45° of rotation. This is because cam surface 66 is only effective during the latter 45° of rotation. In this regard, it should be noted that internal surfaces 104 and 106 of guide slot 64 extend radially of device 62 and thus apply no force to follower 102.

Since the bias on device 62 is reversed approximately midway during its rotation, protuberance 70 will be accelerated by the force of plunger 76 and will become disengaged from the left-hand side of notch 86. Thus, although element 72 (through its engagement with protuberance 70) initially drives device 62 in the counterclockwise direction, once the "over center" point is reached the protuberance 70 shifts rapidly under the force of the plunger until it engages the opposite side of notch 86. At this time, element 72 is forced to rotate slightly further until the right-hand edge of cutout 84 is brought into engagement with stop 82. The final, relative dispositions of these components is shown in FIG. 11.

The traversing of notch 86 by protuberance 70 under the force of plunger 76 represents approximately 30° of rotation by device 62. Therefore, only about 15° of further rotation by element 72 is effected after protuberance 70 engages the right-hand side of notch 86. Thus, in summary, it may be seen that, while device 62 undergoes 90° of rotation, element 72 undergoes increments of rotation of approximately 45° and 15° in that order.

The primary driving power for shifting member 88 is applied to the member (through follower 102) during the angular acceleration of device 62 as protuberance 70 traverses notch 86. At this time, cam 66 is brought to bear against follower 102 and lateral displacement of the member is thereby effected. It is evident that the end result is that yoke 90 is shifted into alignment with pulley 34 to cause belt 36 to slip off pulley 32, as depicted in FIG. 6. It is noteworthy that finger 56 assists in forcing belt 36 to shift from one pulley to the other. This is clearly shown in FIG. 6 where finger 56 is illustrated engaging the side of belt 36 as the pulleys rotate to thereby exert a leftward force on the belt to disengage the same from pulley 32.

It should be understood that belt 36 may be shifted from the smaller pulley 34 back to the larger pulley 32 by rotating shaft 58 in the clockwise direction to return the components of the mechanism from the positions shown in FIGS. 10 and 11 to the dispositions illustrated in FIGS. 8 and 9. In shifting the belt back to pulley 32, cam 68 is employed to actuate member 88. The operation of the apparatus is identical for belt shifting in either direction except that the direction of rotation is reversed.

Having thus described the invention, what is claimed as new and desired to be secured by Letters Patent is:

1. In a belt and pulley assembly having a pair of juxtaposed pulleys:
   a shiftable cam;

a movable member adapted to engage said belt and responsive to movement of said cam for shifting the belt from one of said juxtaposed pulleys to the other thereof, said member being provided with a follower in engagement with the cam during movement of the latter; and means coupled with said cam for shifting the latter from a first position to a second position to actuate said member and thereby shift the belt, said means including structure for shifting the cam from said first position to a predetermined disposition between said positions, and force applying means biasing the cam toward said second position after the cam is shifted from said first position to said predetermined disposition.

2. In a belt and pulley assembly having a pair of juxtaposed pulleys:

shiftable structure movable from a first position to a second position;

mechanism operably associated with said structure for shifting the latter from said first position to a predetermined disposition between said positions;

force applying means independent from said mechanism coupled with said structure and biasing the latter toward said second position after the structure is shifted from said first position to said predetermined disposition; and a movable member adapted to engage said belt and responsive to movement of said structure from said predetermined disposition to said second position for shifting the belt from one of said juxtaposed pulleys to the other thereof.

3. The invention of claim 2, wherein is provided a finger adapted for disposition between said juxtaposed pulleys in radially extending relationship thereto, said finger being operable to disengage the belt from said one pulley during movement of said member.

4. The invention of claim 2, wherein said structure is rotatable, said mechanism including a rotatable element coupled with said structure during shifting of the latter from said first position to said predetermined disposition.

5. The invention of claim 4, wherein said mechanism includes a shaft rigid with the element, said structure being rotatable on the shaft.

6. The invention of claim 4, wherein said means comprises a spring-loaded, swingable plunger in engagement with said structure, the plunger swinging during operation of said mechanism to dispose its line of action in a direction to cause movement of the structure under the force of the plunger when said structure reaches said predetermined disposition.

7. The invention of claim 4, wherein said structure includes a cam, there being a follower on the member in engagement with the cam during said movement of the structure from said predetermined disposition to said second position.

8. In a belt and pulley assembly having a pair of juxtaposed pulleys:

a rotatable device movable about its axis of rotation from a first position to a second position, said device being provided with a cam;

a rotatable actuator element for shifting the device from said first position to a predetermined disposition between said positions;

structure releasably interengaging said element and said device during said shifting of the latter by the element, said structure including yieldable means coupled with the device and biasing the latter toward said first position to maintain said interengagement during said shifting of the device by the element, the yieldable means being operable to bias said device toward said second position and cause the element and the device to disengage when the latter reaches said predetermined disposition; and a movable member adapted to engage said belt and responsive to movement of said device from said predetermined disposition to said second position for shifting the belt from one of said juxtaposed pulleys to the other thereof, said member being provided with a follower in engagement with the cam during said last-mentioned movement of the device.

9. The invention of claim 8, wherein is provided a shaft, the device being rotatable on the shaft, said element being rigid with the shaft.

10. The invention of claim 8, wherein said yieldable means comprises a spring-loaded, swingable plunger in engagement with said device, the plunger being disposed to bias said device toward said first position during movement of the device to said predetermined disposition, the plunger swinging during said last-mentioned movement of the device to dispose its line of action in a direction to cause movement of the device toward said second position under the force of the plunger when said device reaches said predetermined disposition.

References Cited by the Examiner

UNITED STATES PATENTS

| 1,311,095 | 7/1919 | Siren et al. | 74—242.4 |
| 1,564,447 | 12/1925 | Richter | 74—242.4 |
| 3,108,486 | 10/1963 | Azzolari | 74—242 |
| 3,109,316 | 11/1963 | Louzil | 74—242.3 |

FOREIGN PATENTS

| 94,544 | 6/1960 | Netherlands. |

DON A. WAITE, *Primary Examiner.*